United States Patent
Freed

(10) Patent No.: US 10,020,940 B2
(45) Date of Patent: Jul. 10, 2018

(54) IDENTITY-BASED ENCRYPTION FOR SECURING ACCESS TO STORED MESSAGES

(71) Applicant: Oracle International Corporation, Redwood Shores, CA (US)

(72) Inventor: Edwin E. Freed, Claremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 448 days.

(21) Appl. No.: 14/628,595

(22) Filed: Feb. 23, 2015

(65) Prior Publication Data
US 2016/0246976 A1   Aug. 25, 2016

(51) Int. Cl.
| | |
|---|---|
| H04L 9/30 | (2006.01) |
| H04L 9/08 | (2006.01) |
| H04L 29/06 | (2006.01) |
| G06F 21/60 | (2013.01) |
| G06F 21/62 | (2013.01) |
| G06F 17/30 | (2006.01) |

(52) U.S. Cl.
CPC .......... *H04L 9/30* (2013.01); *G06F 17/30613* (2013.01); *G06F 21/606* (2013.01); *G06F 21/6209* (2013.01); *H04L 9/0819* (2013.01); *H04L 9/0861* (2013.01); *H04L 63/0442* (2013.01); *H04L 63/06* (2013.01); *G06F 17/301* (2013.01)

(58) Field of Classification Search
CPC ........... H04N 21/2353; H04N 21/4432; H04N 21/84; H04N 21/4755; H04N 21/4751; H04N 21/4532; H04N 21/4661; H04N 21/44008; G06F 21/81; G06F 9/4418; G06F 9/442; G06F 11/2284; Y02B 60/1242

See application file for complete search history.

(56) References Cited

U.S. PATENT DOCUMENTS

| 8,627,103 B2* | 1/2014 | Katzenbeisser ..... G06F 21/6218 |
| | | 713/189 |
| 2004/0086124 A1* | 5/2004 | Sasaki .................... H04L 9/0833 |
| | | 380/277 |
| 2007/0041583 A1* | 2/2007 | Boneh .................... H04L 9/0847 |
| | | 380/28 |

(Continued)

OTHER PUBLICATIONS

Schneier, "Applied Cryptography—Protocols, Algorithms, and Source Code in C," Second Edition, Chapter 19: Public-Key Algorithms, pp. 461-482 (1996).

(Continued)

*Primary Examiner* — Nelson Giddins
(74) *Attorney, Agent, or Firm* — Jenkins, Wilson, Taylor & Hunt P.A.

(57) ABSTRACT

A method, system, and computer program product for securing access to stored messages using identity-base encryption are disclosed. The method includes generating a master private key and generating a corresponding master public key. The master private key and the master public key are both generated at a messaging client. The method also includes transmitting the master private key from the messaging client to a messaging server. The transmittal of the master private key to the messaging server is performed without transmitting the master private key.

20 Claims, 10 Drawing Sheets

(56) References Cited

U.S. PATENT DOCUMENTS

| | | | |
|---|---|---|---|
| 2013/0111196 A1* | 5/2013 | Pasam .................... | G06F 21/575 |
| | | | 713/1 |
| 2014/0281514 A1* | 9/2014 | Erofeev .............. | G06F 21/6218 |
| | | | 713/165 |
| 2015/0319151 A1* | 11/2015 | Chastain ............... | H04W 12/04 |
| | | | 713/171 |
| 2015/0381729 A1* | 12/2015 | Manohar ............. | H04L 67/1097 |
| | | | 709/203 |
| 2017/0142082 A1* | 5/2017 | Qian .................... | H04L 63/061 |

OTHER PUBLICATIONS

Schneier, "Applied Cryptography—Protocols, Algorithms, and Source Code in C," Second Edition, Chapter 22: Key-Exchange Algorithms, pp. 513-525 (1996).

\* cited by examiner

Master Key Pair Generation

FIG. 3 –
Public Key Generation
for a Corresponding Identifier

FIG. 4 –
Message Handling

FIG. 5 –
Message Retrieval

FIG. 6 –
Message Sharing

**FIG. 7 –
Index Creation (per identifier)**

FIG. 8 – Word Search

IDENTITY-BASED ENCRYPTION FOR SECURING ACCESS TO STORED MESSAGES

FIELD OF THE INVENTION

This invention relates to securing messages, and more particularly, to securing access to stored messages using identity-based encryption.

DESCRIPTION OF THE RELATED ART

Messaging systems (provided and serviced by message service providers) are used by many to create, send, and store messages using a messaging account. Users of messaging systems expect some level of privacy and protection for their stored messages. However, problems related to controlling access to such stored messages often arise.

BRIEF DESCRIPTION OF THE DRAWINGS

The present invention may be better understood, and its numerous objects, features and advantages made apparent to those skilled in the art by referencing the accompanying drawings.

Figure 1:
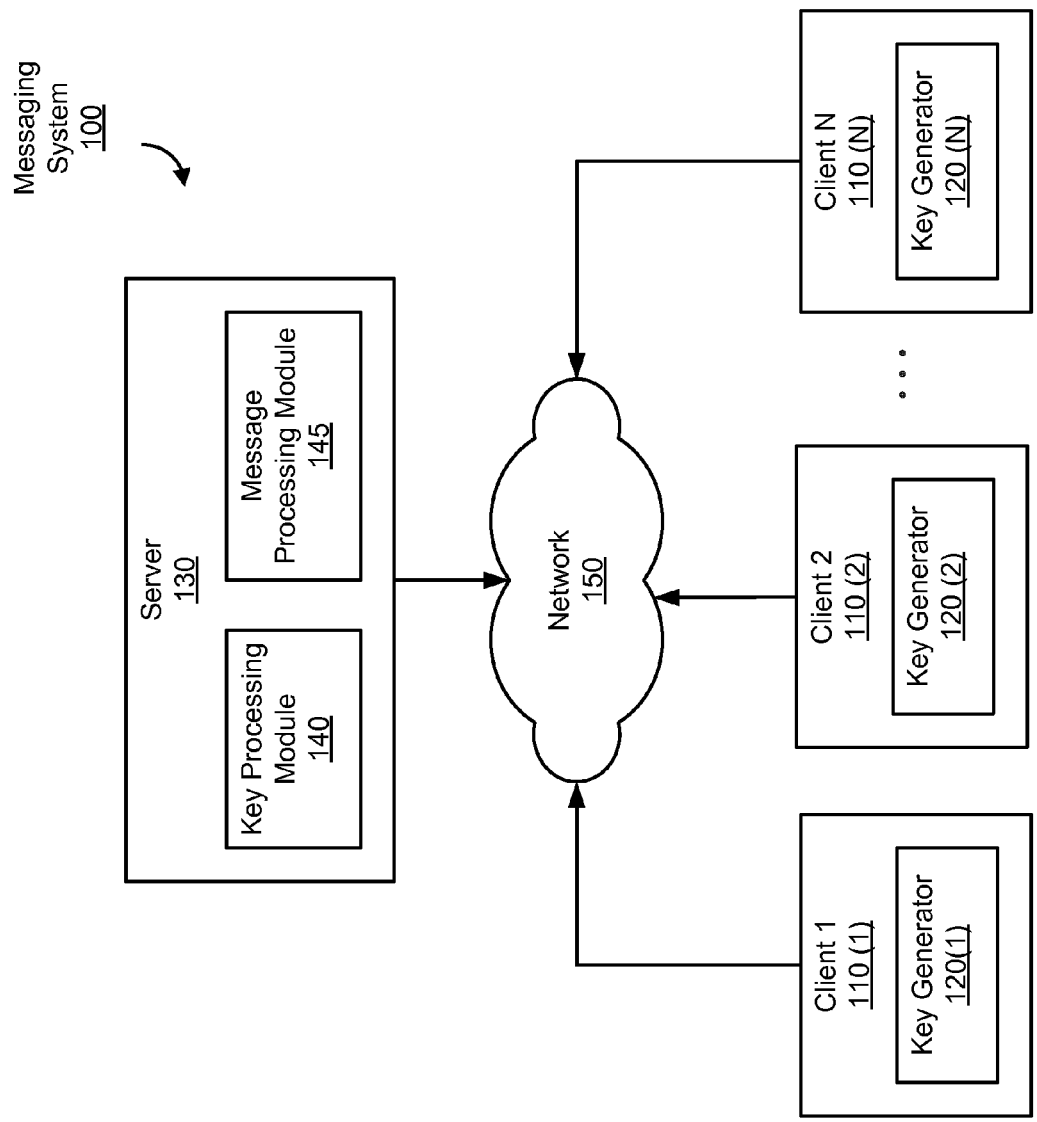
FIG. 1 is a simplified block diagram illustrating components of an example system in which the present disclosure can be implemented, according to one or more embodiments.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intentions are to cover all modifications, equivalents, and alternatives falling within the spirit and scope of the present disclosure as defined by the amended claims.

DETAILED DESCRIPTION

A messaging system is designed to allow one or more users to create, send, and receive messages. Whenever a message is created by a user (e.g., by a user operating a client computer), the message is transmitted to a server (e.g., a server managed by a message service provider). The server, upon receiving the message (and any accompanying message parts (e.g., metadata, attachments, and so on)), assigns a category or label to the message, stores the message using the assigned category or label (e.g., as a copy of a sent message), and forwards the message to the intended recipient, if appropriate.

Access to stored messages is limited, primarily, by a message service provider. Such access should ideally be limited to the original user who drafted the message. In some cases, however, policies may be defined to allow others (e.g., a system administrator or administrative software) to request and access a user's stored messages. Such policies are typically limited to messaging systems that are provided to the user as part of performing a job (e.g., MICROSOFT OUTLOOK®, or the like).

In some cases, a message service provider may share access to a user's stored messages, even in cases where messaging systems are limited to personal use. For example, a message service provider may be required to share access to stored messages in a user's personal messaging account, in order to comply with state or federal programs and/or laws. These programs and/or laws may, for example, be directed to preventing and/or solving crimes, and thus require participation by message service providers as part of electronic surveillance programs Such mandates apply to many of the commonly used message service providers (e.g., such as MICROSOFT®, GOOGLE®, YAHOO®, and the like), which service and maintain message accounts such as HOTMAIL®, GMAIL®, YAHOO MAIL®, and so on.

One example of a federal government program that requires message service providers to provide access to a user's stored messages is the Personal Record Information System Methodology (PRISM) program implemented by the National Security Agency (NSA). The PRISM program was launched by the NSA as an electronic surveillance data mining program in an attempt to prevent acts of terrorism. In particular, the PRISM program was designed to collect stored messages based on demands made to Internet companies to turn over data that matched certain criteria (e.g., search terms). Any stored messages that met such criteria (whether encrypted or not) were to be shared with the NSA. In addition, any necessary keys or mechanism needed to decrypt such messages were also shared with the NSA as part of the program.

In light of the above, better security was and continues to be sought by users to better protect their stored messages. Preferably, a user would like to prevent message service providers from being able to share and allow access to the user's stored messages, even if the message service providers are compelled to do so. Because of programs like PRISM, users are no longer willing to rely solely on their message service providers to limit access to stored messages. The messaging system of FIG. 1 provides a mechanism by which users can better protect their stored messages (e.g., also referred to as data at rest) without relying on a message service provider. In particular, the messaging system of FIG. 1 provides encryption protection for messages by removing the means by which message service providers can share and/or allow others to access a user's stored messages.

Encryption for stored messages can be accomplished using a number of different encryption techniques. One technique is to use encryption tools such as Secure Multipurpose Internet Mail Extensions (S/MIME) or Pretty Good Privacy (PGP). These encryption tools require that a user provide a message service provider with a public key, which is used to encrypt the message, upon arrival. To access a stored message, the user downloads the encrypted message, as received from the message service provider, and decrypts the message locally. Thus, the information that is necessary to decrypt stored messages is never shared with the message service provider, which increases overall security for stored messages. However, encryption tools such as S/MIME and PGP have a number of drawbacks. These drawbacks include exposure to message metadata (which is not encrypted), an inability to access individual message parts (which poses significant performance problems for mobile users), limited to non-existent search capabilities by a message service provider, and/or an inability to share messages with others.

An alternative encryption technique is mailbox encryption, which encrypts the entire contents of a mailbox. Such a technique encrypts all stored messages in a mailbox using a unique key, which is then encrypted with a public key provided by the mailbox owner. To access a stored message, the user must provide a private key to the message service provider, which is then used to decrypt the requested message. This approach allows the message service provider and the user to access individual message parts and lets the message service provider perform search operations, as needed. Nevertheless, mailbox encryption requires that a user provide a private key for an entire mailbox to the message service provider to access a single message, which exposes the contents of the entire mailbox while the individual message is being accessed. In addition, sharing of messages is not possible and/or limited with mailbox encryption.

Identity-based encryption is yet another encryption technique that can be used. Identity-based encryption involves the generation of a master key pair (e.g., a master private key and a master public key) and the publishing of the master public key. Using an identifier, additional public and private keys are then generated using the master private and public keys. Typically, however, identity-based encryption is implemented by a message service provider. The message service provider is the entity that generates the master key pair and publishes the master public key. Each user is then given a unique master public key, which is generated using an identifier that represents the user's account information (e.g. the user's email address). However, using identity-based encryption as explained above, does not serve to protect a user's stored messages, given that master private keys are generated and stored by the message service provider (which can ultimately share such information with others, as needed or requested by government programs and/or laws).

In order to apply identity-based encryption in a manner that increases security for stored messages, the entity generating and sharing keys is reversed and/or performed differently. In particular, the entity generating and sharing keys is the user (via the client) and not the message service provider. Doing so allows the client to limit access to stored messages by retaining the means (e.g., the master private key) by which stored messages can be successfully decrypted. Thus, in such cases, a message service provider does not store or have access to the information necessary to decrypt a user's stored messages at any point in time, which ultimately maximizes security for a user's stored messages.

The messaging system 100 of FIG. 1 uses identity-based encryption in such a manner. In particular, the clients in messaging system 100 each generate a master key pair. The master private key portion is retained by the client (for security purposes) and the master public key portion is transmitted to the server (e.g., the message service provider). The server then combines the master public key with an identifier for one or more messages to generate a public key for the given identifier. In order to access a stored message, the client requests one or more encrypted parts of a message. Upon receipt, the client can decrypt the parts of the message, as needed, using the master private key for the identifier (which is generated using the master private key and the known identifier for the message).

As shown, messaging system 100 of FIG. 1 includes an N number of clients, illustrated as client 110(1), client 110(2), and so on, which are hereinafter collectively referred to as clients 110. Each client 110 comprises a key generator, illustrated as key generator 120(1), key generator 120(N), and so on, which are hereinafter collectively referred to as key generators 120. Messaging system 100 further includes a server 130 (which includes a key processing module 140 and a message processing module 145) and a network 150.

Each client 110 represents a client system used by one or more users to create, send, and receive messages. For example, a user can access or log into one of clients 110 to access a messaging account, in order to create a new message, view or access incoming messages, access stored or previously sent messages, delete messages, and so on. Each client 110 includes a key generator 120. Key generator 120 is used to create a master key pair (e.g., a master private key and a master public key), which is used for identity-based encryption purposes.

Clients 110 retain the master private key to ensure only clients 110 can decrypt stored messages that were encrypted prior to storage. The master public key, however, is not a secret, and is transmitted to server 130. By retaining the master private key at client 110, client 110 ensures that the master private key is never exposed to server 130, which significantly reduces the risk to a user with regards to stored messages. This is because without a master private key, server 130 is unable to decrypt message data, once such message data has been stored in an encrypted manner. If server 130 does not have access to the master private key (which enables decryption), server 130 cannot share such information with any requesting organizations, thereby limiting access to a user's stored messages. In addition, server 130 is also unable to successfully move a message from one identifier/folder/group to another, given that server 130 lacks the master private key.

Clients 110 are able to request access to one or more parts of a message by sending such requests to server 130 via network 150. Such requests are processed by server 130, and more particularly by message processing module 145. A request for one or more message parts typically includes a request for an interchange key associated with the message. Such an interchange key is used to decrypt the one or more parts of a message received from server 130 in an encrypted form.

Upon receiving the requested one or more parts of a message and/or an interchange key (in an encrypted form), clients 110 utilize the master private key, along with the identifier for a message, to generate the private key for the identifier. The private key for the identifier is used to decrypt the interchange key, which is then used to decrypt the one or more message parts. Thus, the private key for the message identifier (which can only be derived from the master private key that is retained by client 110) provides the means necessary to decrypt the stored one or more parts of a message. Server 130 is unable to create a private key for a message identifier, given that server 130 only maintains a copy of a master public key, and not the master private key. As such, server 130 cannot access or provide access to such stored messages. Likewise, server 130 cannot successfully move a message from one identifier/folder/group to another.

Of further note, each client 110 is able to move a message without downloading and uploading the message to and from server 130. As an example, a client 110 first downloads an encrypted interchange key for the message to be moved. The encrypted interchange key is then decrypted using the private key corresponding to the message identifier (e.g., the identifier for the message at the current location). Thereafter, the public key corresponding to the new identifier (e.g., the identifier for the message at the new location) is encrypted. The newly encrypted public key corresponding to the new identifier for the new location is then uploaded, and the encrypted message and encrypted metadata are moved to the new location as is.

Server 130 represents a message service provider. Server 130 services (e.g., provides messaging functionality to) a plurality of clients, illustrated as clients 110. Server 130 includes a key processing module 140. Key processing module 140 receives and processes encryption keys, such as those received from one or more of clients 110. As an example, key processing module 140 receives a master public key from each client 110. Upon receipt, key processing module assigns an identifier to a group of messages stored as such within a user's messaging account.

An identifier can be, for example, a folder name (e.g., such as the user's inbox folder or the user's sent messages folder), a tag name (e.g., such as the user's primary tag, the user's social tag, and so on), or another type of label that helps identify a grouping for messages within the user's messaging account. As an example, an identifier for a message can be a folder name, such as sent messages, if the message is to be grouped within the user's sent messages folder. Such a folder name helps identify the user's messaging account and the location in which the message is to be stored.

Once key processing module 140 assigns an identifier to a group of messages for a client user, key processing module 140 generates a public key corresponding to the identifier. The public key corresponding to the identifier is generated, for example, by combining the identifier and the master public key. Once generated, the public key corresponding to the identifier is stored for later retrieval and use (e.g., such as when a message is received and/or to be accessed by the original user).

Message processing module 145 receives and processes messages. Upon receipt of a message at the server, message processing module 145 determines the identifier to be associated with the message. For example, message processing module 145 determines the folder name (or tag name, or the like) to be associated with the message by determining where such message will be stored within the user's messaging account. Once the identifier is determined, the public key corresponding to the identifier is retrieved.

Whenever server 130 receives a message, message processing module 145 handles all necessary processing for the message. First, message processing module 145 identifies the structure of the message to identify one or more parts of the message and the characteristics of the message. For example, message processing module 145 identifies the message text, metadata, attachments, and so on. Moreover, message processing module 145 also identifies the message type, the message type parameters, and the beginning and ending offsets for each message part. Doing so enables the server to divide the message accordingly, in preparation for providing access to only one or more parts of the message at a time. In some instances, for example, a client user may request to access only the metadata of a message first. Such information may then allow the client user to determine whether access to other message parts is desirable.

To enable encryption for the received message, message processing module 145 generates an interchange key. The metadata of the message is encrypted using the interchange key. Similarly, the message text, and attachments (if applicable), are also encrypted with the interchange key. Message processing module 145 then encrypts the interchange key with the public key corresponding to the identifier. The encrypted portions of the message and the encrypted interchange key are then stored. At this point, the encrypted message parts and the encrypted interchange key can only be decrypted using the private key corresponding to the identifier for the message (e.g., a parameter that is only derivable from the master private key that is retained by client 110).

Message processing module 145 also processes requests for access to stored messages, as received from a user client. A user client may request access to the message metadata, the message text, any attachments, or some combination thereof. Message processing module 145 receives such requests and provides access to the requested message parts accordingly. When providing access to such message parts, message processing module 145 provides the message parts and/or the interchange key in an encrypted form.

Network 150 connects server 130 with clients 110. Using network 150, clients 110 and server 130 can communicate with each other to exchange information related to message receipt, handling, and encryption. This includes any information regarding master public keys, messages, and/or requests for access to a message.

In some embodiments, the functionality of messaging system 100 can be expanded to be more resistant to traffic analysis issues. Traffic analysis involves analyzing message access information (e.g., as collected by a server, such as server 130) to infer information regarding stored messages. As an example, some of the information that may be inferred for stored messages includes the location of a message (e.g., which can be inferred by the offsets used to access a given message) or the overall size of a message.

In order to protect against traffic analysis issues, a number of different approaches may be employed. For example, in one approach, the overall size of a message can be obfuscated by tacking on a random amount of additional data at the end of the message. Using such an approach would still allow the actual size of the message to be determined from the encrypted metadata information. In yet another example, the size and position of the parts within a message can be obfuscated by adding a random amount to the offsets in retrieval requests, effectively adding a randomly-sized prefix and suffix area to the message part.

Additional protection against traffic analysis issues may be desirable for heavily accessed stored messages. This is because, if a padding algorithm (and hence the distribution of values the padding algorithm creates) is known for a particular client, parameters of the specific distribution for the part offsets for a stored message may be determined (e.g. over time and with enough accesses of the stored message). Moreover, once the parameters of the specific distribution of a stored message are determined, the size and position of the parts of the stored message can then be inferred or determined, which may suffice to identify the message. In some cases, however, instead of computing a random per-client value, the size of the prefix and suffix for the message are computed by hashing the interchange key for the message in same way in all clients. By doing so, each client can access the stored message, or any part thereof, using the same randomized offsets. Given that the offsets of the message are pseudo-randomly, but consistently, offset, there would be no way to compute the specific distribution of a message, as before.

Figure 2:
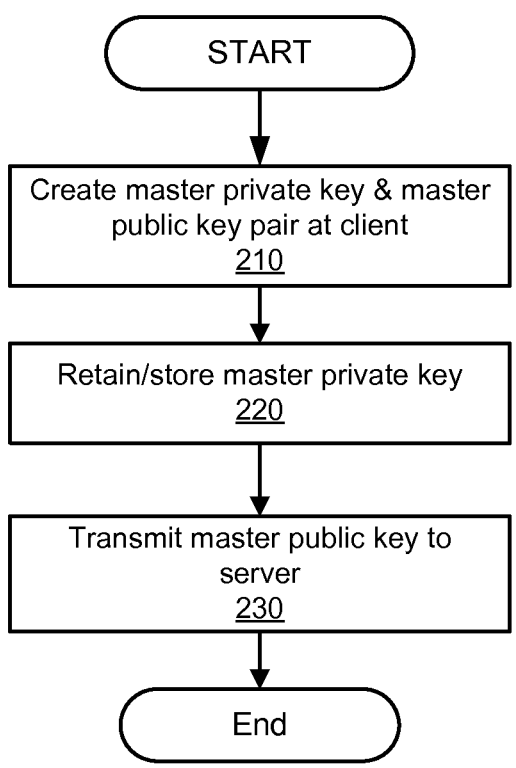
FIG. 2 is a flowchart illustrating an example process for generating a master key pair, according to one or more embodiments.

FIG. 2 illustrates a process for generating a master key pair. The process of FIG. 2 can be performed, for example, by a client, such as one of clients 110 of FIG. 1. The process begins at 210, where the client creates a master key pair, which involves the creation of a master private key and a master public key. This master key pair is unique to the client and is used to generate additional keys. For example, using an identifier for a message, additional keys (e.g., such as a public key for an identifier and/or a private key for the identifier) may be generated, using either the master private key or the master public key.

The method continues to 220, where the client retains and stores the master private key. By retaining the master private key, the client is able to increase security for any messages generated by a user and stored accordingly by a server (e.g., message service provider). This is because the master private key is the component that is needed to decrypt any additional keys for a message (e.g., such as an interchange key) or message parts (e.g., such as metadata, text, or attachments) that have previously been encrypted.

At 230, the master public key is transmitted from the client to a server, such as server 130 of FIG. 1. The server can utilize the master public key to generate additional public keys, such as public keys that correspond to an identifier for a message. At this point, the process of FIG. 2 ends.

Figure 3:
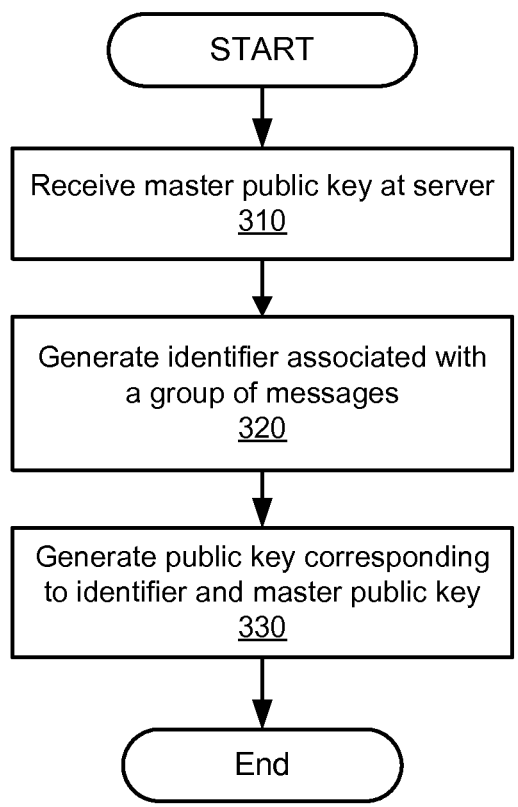
FIG. 3 is a flowchart illustrating an example process for generating a public key for a corresponding identifier, according to one or more embodiments.

FIG. 3 illustrates a process for generating a public key for a corresponding identifier. The process of FIG. 3 can be performed, for example, by a server, such as server 130 of FIG. 1.

The process of FIG. 3 begins at 310, where the server receives a master public key from a client. The process continues to 320, where the server generates an identifier associated with a group of messages. An identifier associated with a group of messages is a name or category that is used to describe the group of messages and the location used to store the group of messages within the user's messaging account. For example, an identifier can be a folder name, a tag name, or the like. In one embodiment, the identifier is created by the server (using information such as the user's name, email address, and the like). Once created, the identifier is assigned to any message that is grouped and stored within the particular group of messages.

Once the identifier for a group of messages has been generated, the process continues to 330. At 330, the server generates a public key for the identifier. The public key for the identifier is derived from the master public key and the generated identifier. The generated public key for the identifier is stored and retrievable for later use (e.g., such as when a new message is received and processed accordingly with the defined group of messages). At this point, the process of FIG. 3 ends. However, other public keys for other identifiers (e.g., for other groups of messages) can be likewise generated by the server using the process of FIG. 3.

Figure 4:
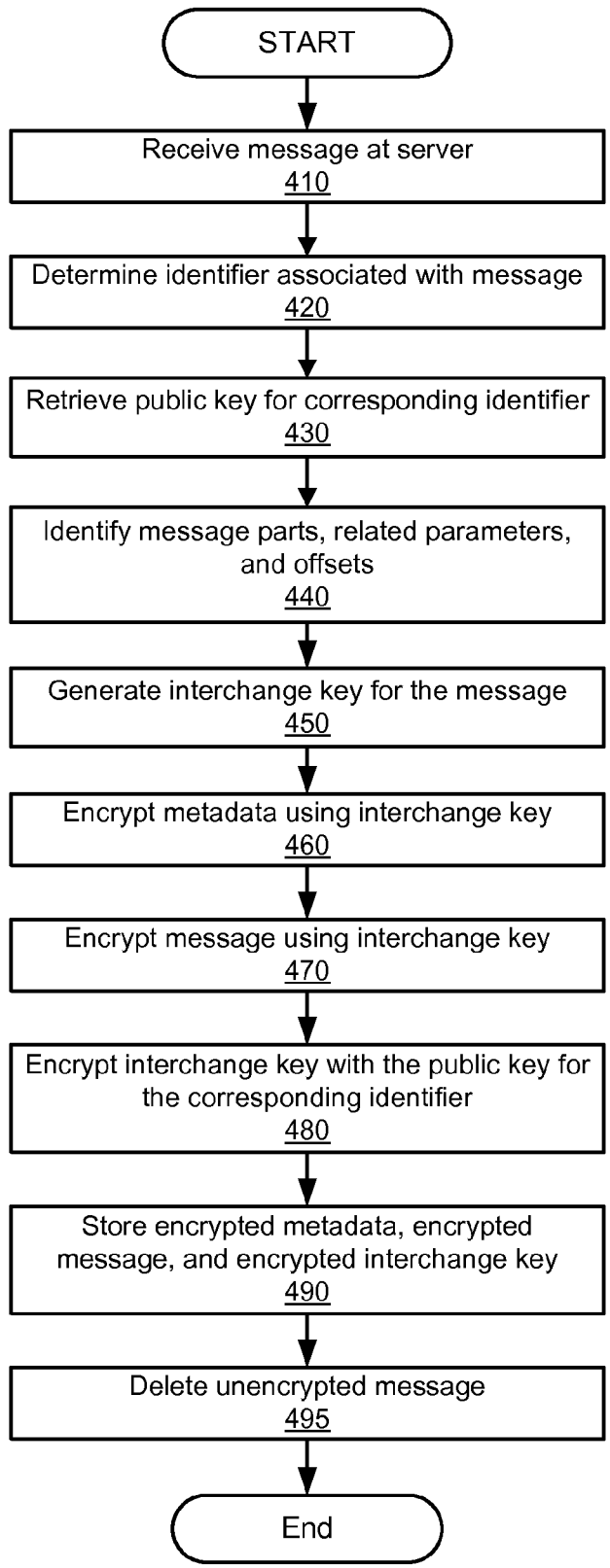
FIG. 4 is a flowchart illustrating an example process for handling messages, according to one or more embodiments.

FIG. 4 illustrates a process for handling messages. The process of FIG. 4 can be performed, for example, by a server, such as server 130 of FIG. 1, in response to receiving a message from a client, such as one of clients 110 in FIG. 1.

The process of FIG. 4 begins at 410, where the server receives a message from a client. The message being received at 410 may include message metadata, text, and/or any attachments. At 420, the server determines an identifier associated with the message. An identifier for the message typically represents a folder name or label to be used in the storage of the received message. For example, an identifier for a message may represent an inbox folder name or a personal tag name that helps identify where such a message will be stored. An identifier for a message can be determined by analyzing the metadata (such as the sender, recipient, or subject name) and/or the content of the message itself. An identifier for a message may have been previously determined by the server, and thus, such an identifier can simply be retrieved at 420.

Once an identifier for the message has been determined or identified, the process continues to 430. At 430, the server retrieves a public key for the identifier. The public key for the corresponding identifier may be generated, for example, using the process of FIG. 3. Once generated, the public key for the corresponding identifier is stored by the server and thus retrievable, as needed. In some embodiments, the public key for the corresponding identifier may not have been previously generated. In such cases, the public key for the corresponding identifier is generated at 430 using the master public key and the identifier determined at 420.

Once the public key for the corresponding identifier has been retrieved, the process continues to 440. At 440, various characteristics and information about the message are identified. Such information may include the text of the message, any attachments (if applicable), the metadata, the message type, the message type parameters, and any offsets related to the different parts of the message.

An interchange key for the message is then generated at 450. The interchange key is a key used for the encryption of a message and its subparts. At 460, the message metadata is encrypted using the interchange key generated at 450. Thereafter, the message content (which includes the message text and any attachments) is encrypted using the same interchange key at 470.

Thereafter, the interchange key is encrypted at 480. In particular, the interchange key is encrypted using the public key for the corresponding identifier (e.g., the identifier determined at 420). At 490, the encrypted metadata, the encrypted message content, and the encrypted interchange key are stored by the server. Once stored, the encrypted contents of the message cannot be successfully moved from one identifier/folder/group to another by the server. At 495, the unencrypted message is deleted permanently. This prevents any unencrypted versions of the message from being stored and/or accessible from the server.

The result of FIG. 4 is such that each component of the message is encrypted separately to enable access to one or more parts to the message by a user. As an example, a server may provide access to a mobile device to only the message metadata, upon request. Doing so enables the mobile client to view the message metadata (e.g., such as message sender and subject name) to determine if additional parts of the message content are desirable. By allowing only some (e.g., the desired) portions of the message to be downloaded at a time, the mobile device can save on overall bandwidth and network resources. At this point, the process of FIG. 4 ends.

Figure 5:
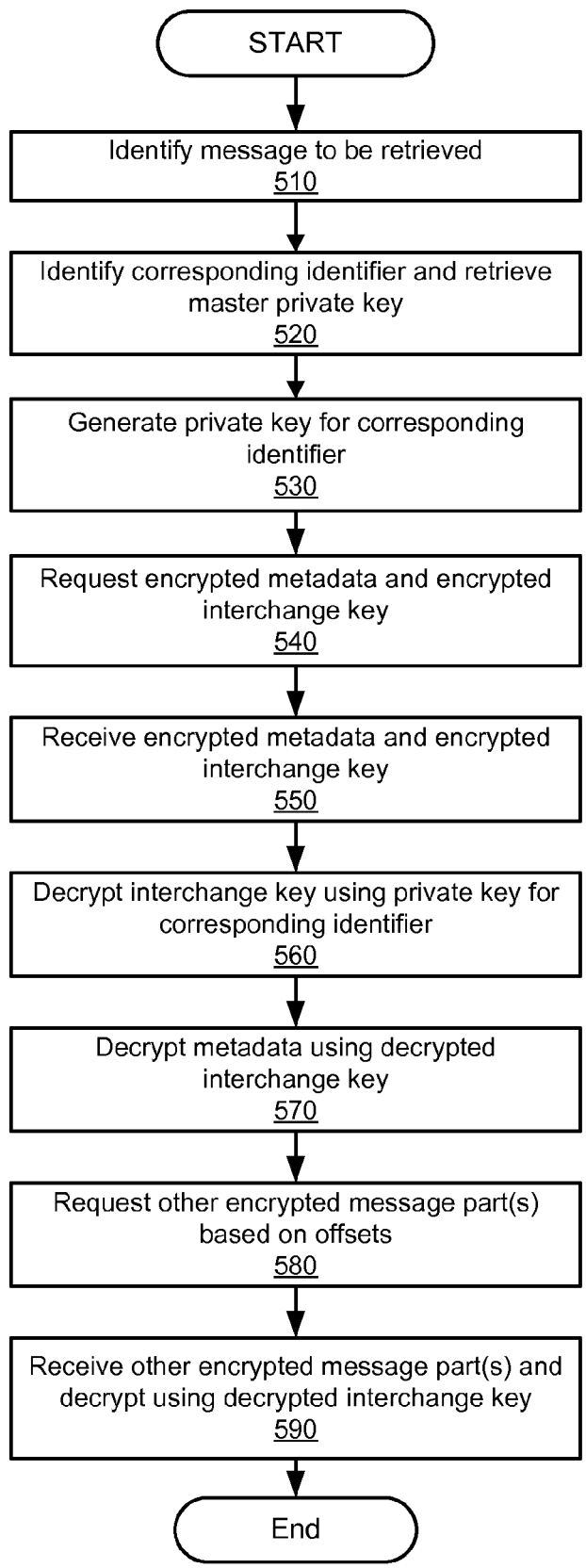
FIG. 5 is a flowchart illustrating an example process for retrieving messages, according to one or more embodiments.

FIG. 5 illustrates a process for retrieving messages. The process of FIG. 5 can be performed, for example, by a client, such as one of clients 110 of FIG. 1.

The process of FIG. 5 begins at 510, where a client identifies a message to be retrieved. Such a message may be identified by the date, subject, and/or sender. At 520, the client also identifies a corresponding identifier for the message to be retrieved. For example, the client identifies the folder name or tag name used for storing the message to be retrieved within the user's messaging account.

At 530, the client generates a private key corresponding to the identifier. In order to do so, the client first retrieves the master private key. The master private key was previously generated and stored by the client, for the purpose of maintaining message privacy and being able to request access to one or more stored messages. Using the identifier and the master private key, the client generates a private key for the identifier. The private key for the corresponding identifier is then used to access and decrypt one or more encrypted parts of a message, as provided by a server.

A client can request access to one or more parts of a message through the use of offsets. As shown, a client first requests access to encrypted metadata for a message at 540. Such a request typically also includes a request for an encrypted interchange key that was used to encrypt the message. Requesting parts of a message, as opposed to the entire contents of the message, can be desirable for a number of different reasons. For example, a client user that is limited by the capabilities of a mobile device may not wish to see the entire contents of a message, if such functionality will result in an unacceptable delay or degraded performance of the mobile device. In such cases, a mobile user may wish to request only the metadata, which can then enable the user to view information about the message (such as the sender name and subject matter), prior to deciding whether to request any other parts of the message.

A server, upon receiving a request for access to the metadata, will search for the requested metadata using the message identifier and message information. Once the requested metadata has been found, a similar search can be performed for the interchange key used to encrypt such metadata. Once both components have been found, the encrypted metadata and the encrypted interchange key are transmitted back to the client. The client receives the encrypted metadata and encrypted interchange key at 550.

At 560, the client decrypts the encrypted interchange key using the private key generated for the corresponding identifier. The decrypted interchange key is then used to decrypt the encrypted metadata at 570. By operating in this manner, a client, and not the server, controls and limits access to such metadata. This is because a private key for a corresponding identifier (which requires the use of the master private key) is needed to decrypt both the encrypted interchange key and the encrypted metadata. As designed, the client is the only component that creates and maintains the master private key. Such a key is never shared with the server. Thus, the server does not have the information necessary to decrypt and view the stored metadata.

Once the metadata has been viewed, a user may seek to request other parts of the message (such as the message content or attachments). The other parts of the message are requested at 580. These other parts of the message are identified and searched for by a server using the metadata and/or other message information. Once found, these other parts of the message are sent back to the client and received by the client at 590. These other parts of the message are decrypted using the decrypted interchange key from 560.

As shown in FIG. 5, metadata for a message is requested first, followed by a request for other parts of the message (using offset information). In other embodiments, however, a client may request parts of the message in a different order. Even further, in some cases, only the metadata may be requested. Such may be the case where the user decides not to request access to other parts of the message based on the content of the metadata. At this point, the process of FIG. 5 ends.

Figure 6:
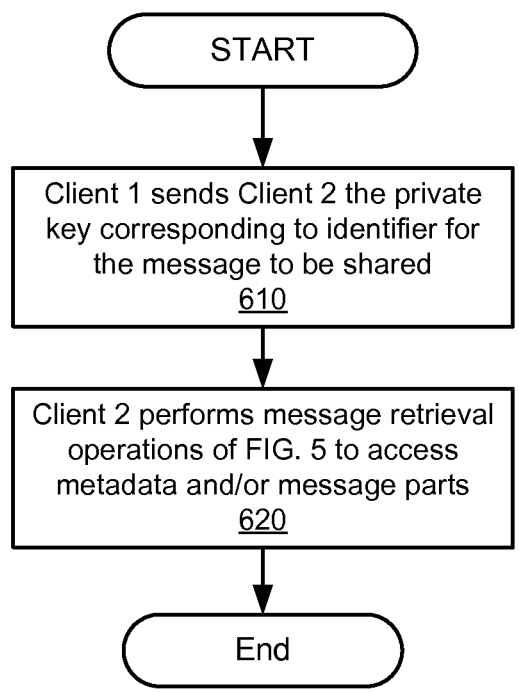
FIG. 6 is a flowchart illustrating an example process for sharing messages, according to one or more embodiments.

FIG. 6 illustrates a process for sharing messages. The process of FIG. 6 can be performed, for example, between two clients, when a first client wishes to share a message with another client.

A first client wishing to share a message with a second client will first identify the message to be shared. This includes identifying the message to be shared, the corresponding identifier for the message, and the private key corresponding to the identifier for the message. Once identified, the first client (e.g., client 1) shares access to the message with the second client (e.g., client 2). This is performed by transmitting the private key corresponding to the identifier for the message to client 2, as shown in 610.

In response thereto, the second client is able to request access to such a message in 620 by performing a message retrieval process, such as the message retrieval process of FIG. 5. By performing the process of FIG. 5, client 2 can request access to the metadata, the message content, any attachments, and/or the interchange key for the message (in the encrypted form). At this point, the process of FIG. 6 ends. The process of FIG. 6 can be repeated by the first client to share the message with other client systems.

Figure 7:
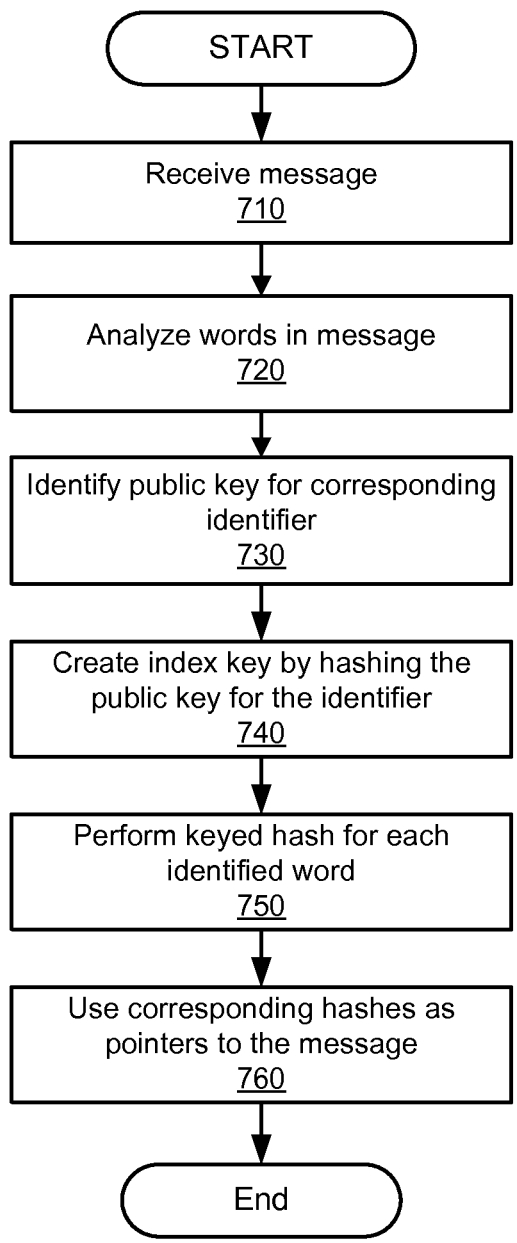
FIG. 7 is a flowchart illustrating an example process for creating a per-identifier index, according to one or more embodiments.

FIG. 7 illustrates a process for creating a per-identifier index. The process of FIG. 7 can be performed, for example, by a server, such as server 130 of FIG. 1. The server may wish to create an index to enable searches within a user's messaging account. More particularly, the server may wish to create a per-identifier index to enable searches within a particular folder or tag in the user's messaging account. Such an index is created by the server upon receiving a message from the client.

The process begins at 710, where the server receives a message from a client. At 720, the server analyzes each word in the message, in preparation for inclusion of such words in the index. Given that the index to be created is specific to an identifier, the corresponding identifier and public key corresponding to the identifier are identified at 730.

Next, the server creates a key for the index, referred to as the index key. The index key is generated by applying a hash function to the public key for the identifier. At 750, the server performs a keyed hash for each word identified in 720. A keyed hash is performed by applying a hash function to each word identified in the message, using the index key created at 740. The resulting hash values are used as pointers to such words at 760. Thus, the index created by the server includes each word in the message, along with a corresponding hash value that points to the location of the message that includes the word.

By using a per-identifier index, a server can receive search requests from a client, where such requests are directed to searching for particular words within a group of messages defined by the corresponding identifier. The search functionality is described in greater detail with reference to FIG. 8. Whenever a search for words is performed, the resulting outcome includes a set of pointers that define where such words are found within the corresponding messages. At this point, the process of FIG. 7 ends.

Figure 8:
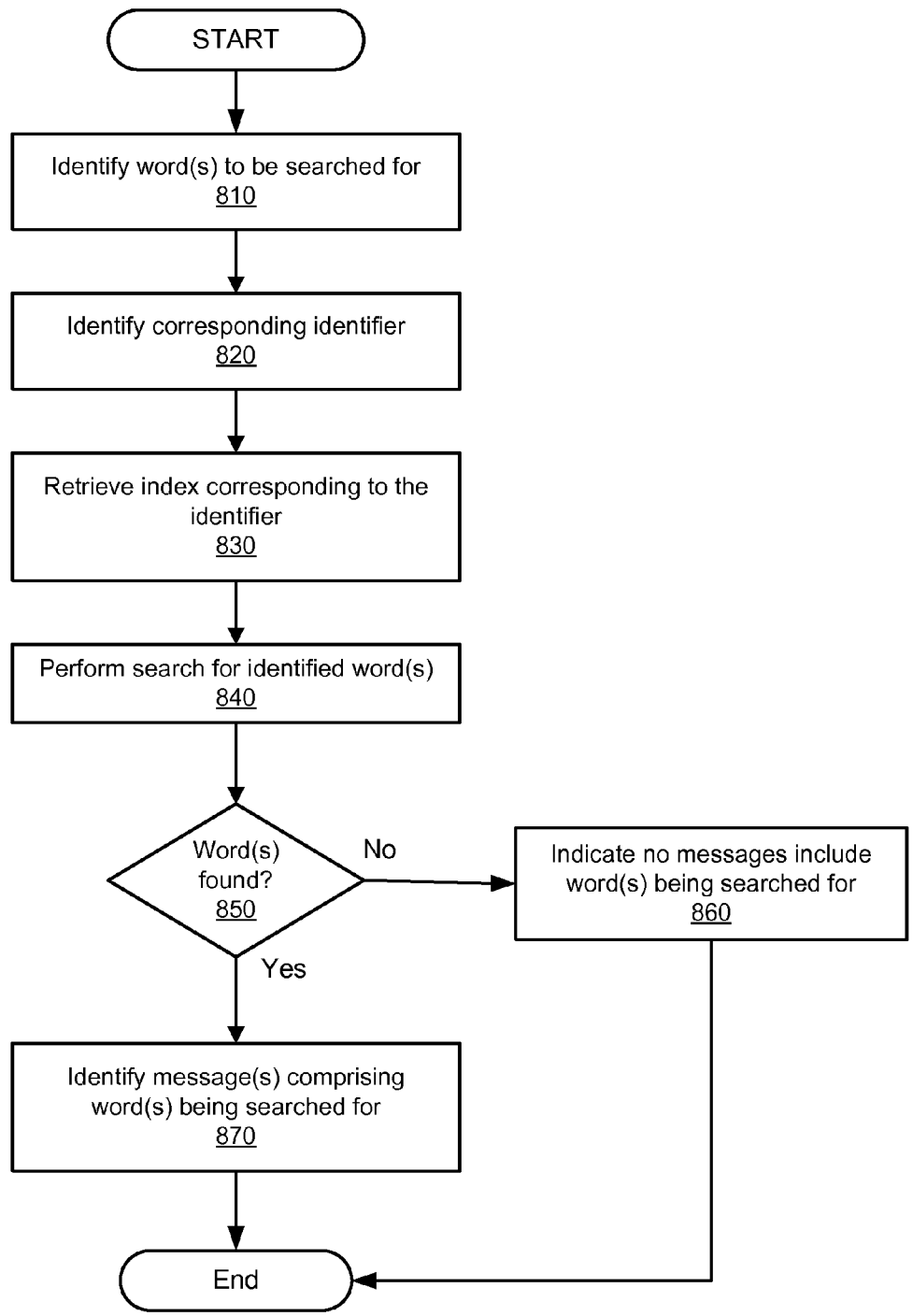
FIG. 8 is a flowchart illustrating an example process for performing a word search, according to one or more embodiments.

FIG. 8 illustrates a process for performing a word search. The process of FIG. 8 can be performed, for example, by a server, such as server 130 of FIG. 1.

The process begins at 810, where the server identifies one or more words to be searched for within a group of messages. Such words can be identified as a result of a request submitted by the client. At 820, the corresponding identifier is identified. The corresponding identifier identifies the group of messages to be searched. For example, if an identifier is a folder name, the search will be limited to searching within messages in the particular folder. As such, the corresponding identifier for a search is used to narrow the search to a group of messages and also to identify the correct index to be used to perform the word search.

The process continues to 830, where the server retrieves the identifier index to be used for the word search. Such an index is generated, for example, using the process of FIG. 7, and is specific to messages assigned to the same identifier. The identifier index, and the contents therein, are then used to perform the word search at 840. An index for a corresponding identifier typically includes a list of words found within messages, where such words are mapped to one or more hash values. These hash values represent pointers to sections of messages that include such words.

At 850, a determination is made as to whether any of the words being searched for produce a match. If no match is found, an indication is made at 860 that the word(s) being searched for are not included within any messages in the group of messages corresponding to the identifier. Such an indication is then transmitted back to the client. In some embodiments, an alternative set of words may be used for a subsequent word search.

Alternatively, if a match is found, the process continues to 870. At 870, the one or more messages comprising the words being searched for are identified. This is performed, for example, by identifying the pointers listed for each matching word. These pointers are used to locate the sections in one or more messages that include such words. The pointer information and/or the sections of the message that include the words being searched for are presented to the user at 870. The client can subsequently submit a request to access the identified messages, in part or in whole, using the message retrieval process of FIG. 5. At this point, the process of FIG. 8 ends.

An Example Computing and Network Environment

As shown above, the present invention can be implemented using a variety of computer systems and networks. An example of one such computing and network environment is described below with reference to FIGS. 9 and 10.

Figure 9:
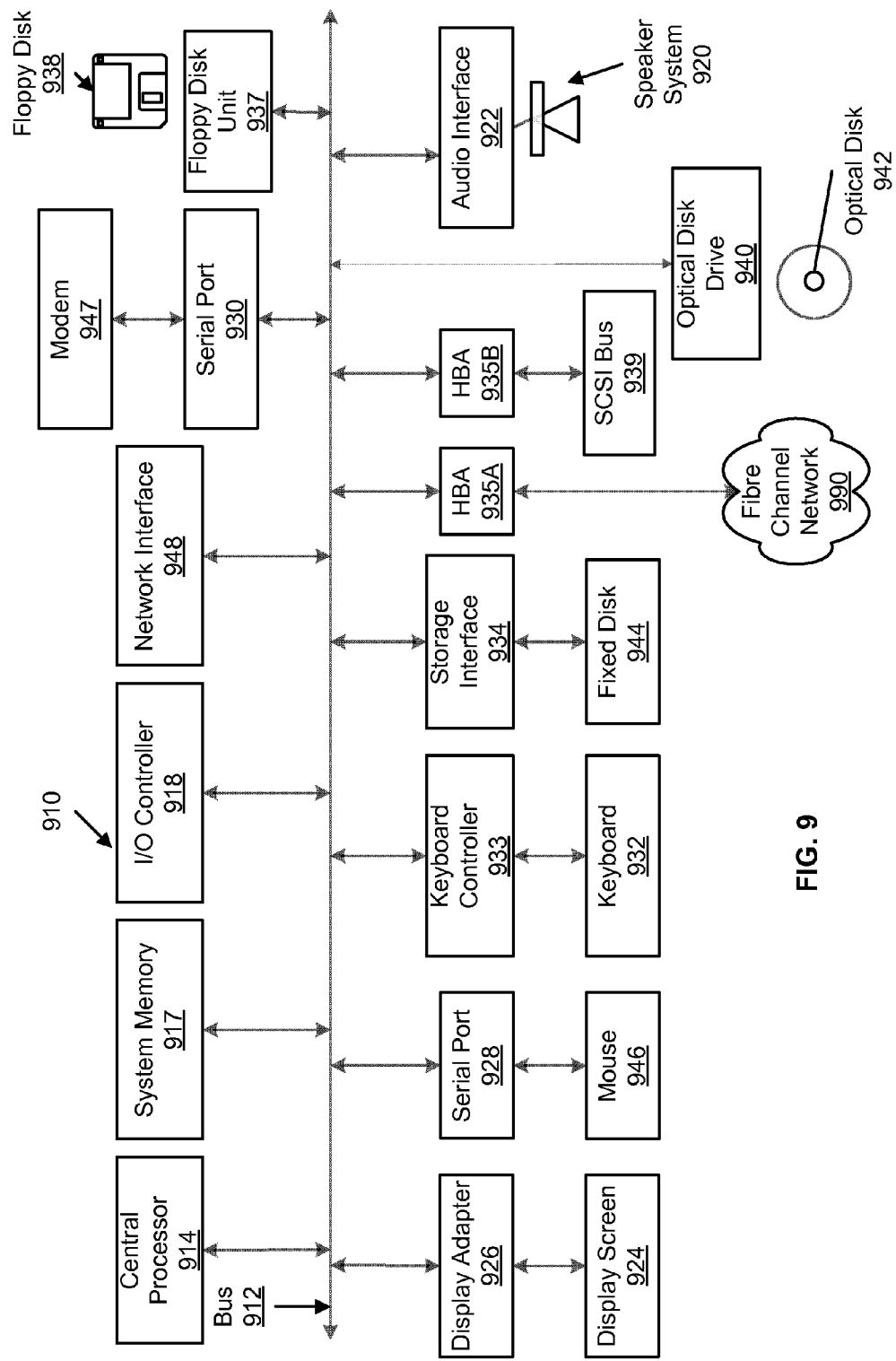
FIG. 9 is a simplified block diagram of an example computer system for implementing aspects of the present disclosure, according to one embodiment.

FIG. 9 depicts a block diagram of a computer system 910 suitable for implementing aspects of the present invention Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio interface 922, an external device, such as a display screen 924 via display adapter 926, serial ports 928 and 930, a keyboard 932 (interfaced with a keyboard controller 933), a storage interface 934, a floppy disk unit 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer-readable medium, such as a hard disk drive (e.g., fixed disk 944), an optical drive (e.g., optical disk drive 940), a floppy disk unit 937, or other storage medium. Additionally, applications can be in the form of electronic signals modulated in accordance with the application and data communication technology when accessed via modem 947 or network interface 948. Storage interface 934, as with the other storage interfaces of computer system 910, can connect to a standard computer-readable medium for storage and/or retrieval of information, such as a fixed disk 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
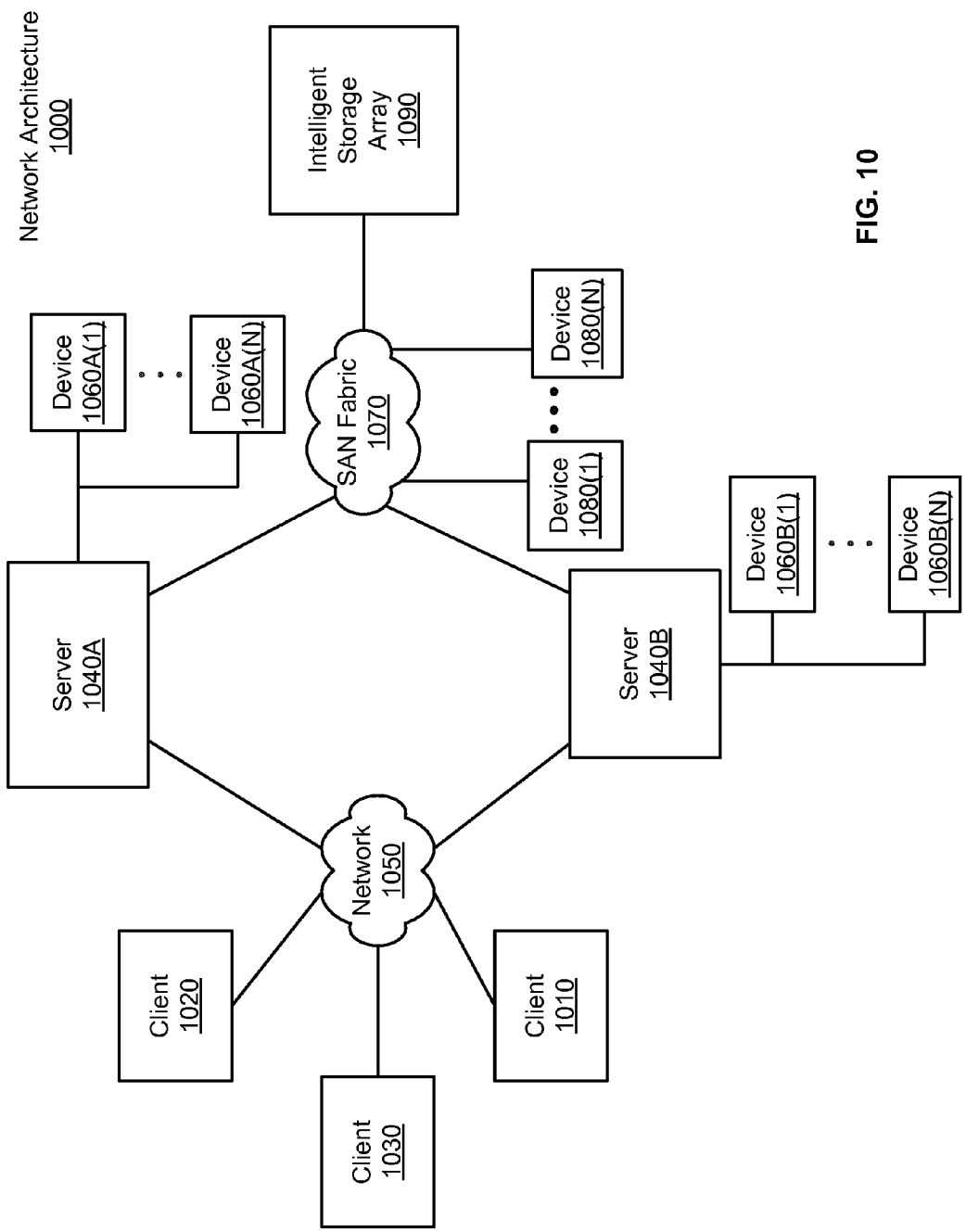
FIG. 10 is a simplified block diagram of an example network architecture for implementing aspects of the present disclosure, according to one embodiment.

FIG. 10 is a block diagram depicting a network architecture 1000 in which client systems 1010, 1020 and 1030, as well as storage servers 1040A and 1040B (any of which can be implemented using computer system 1010), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   generating a master private key;
   generating a master public key, wherein
      the master public key corresponds to the master private key, and
      the master public key and the master private key are generated at a messaging client;
   transmitting the master public key, wherein
      the transmitting is performed without transmitting the master private key,
      the messaging client is configured to perform the transmitting the master public key, and
      the messaging client is configured to transmit the master public key to a messaging server;
   transmitting, to the messaging server by the messaging client, a message comprising a plurality of message parts that includes at least message text and message metadata;
   utilizing, by the messaging server, offset information to divide the message into the plurality of message parts that are stored in the messaging server; and
   requesting, by the messaging client from the messaging server, at least one of the message parts of the message stored in the messaging server using the offset information and an interchange key corresponding to the message, wherein the interchange key is decrypted by the messaging client using the master private key and used by the messaging client to decrypt the at least one of the requested message parts that has been encrypted by the messaging server;

wherein requesting, by the messaging client from the messaging server, further comprises:
generating, by the messaging client, a message retrieval request for at least one of the message parts of the message stored in the messaging server;
generating, by the messaging client, a sized prefix and suffix area to the at least one of the message parts wherein the size of the prefix and suffix area is computed by hashing the interchange key; and
adding, by the messaging client, the sized prefix and suffix area to the offset information of the message retrieval request to obfuscate size and position information of the at least one of the message parts stored in the messaging server.

2. The method of claim 1,
wherein the message is to be grouped as part of a first group of messages, and the first group of messages is identified by an identifier.

3. The method of claim 2, further comprising:
retrieving the master private key;
generating a private key for the identifier;
receiving the at least one of the message parts and the interchange key,
wherein
the at least one of the message parts and the interchange key are received in an encrypted form, and
the at least one of the message parts and the interchange key are received in the encrypted form from the messaging server;
decrypting the interchange key using the private key for the identifier, wherein the decrypting produces a decrypted interchange key; and
decrypting the at least one of the message parts using the decrypted interchange key.

4. The method of claim 2, further comprising:
transmitting a private key corresponding to the identifier to a second messaging client, wherein
the transmitting is performed by the messaging client, and
the transmitting allows the second messaging client to access the message from the messaging server.

5. The method of claim 1, further comprising:
receiving a master public key identifier, wherein the master public key identifier is received by the messaging server;
identifying an identifier for a first group of messages; and
generating a public key for the identifier, wherein
the public key for the identifier is generated by combining the master public key with the identifier, and
the public key for the identifier is generated by the messaging server.

6. The method of claim 5, further comprising:
receiving a message, wherein
the message is to be grouped as part of the first group of messages;
generating an interchange key for the message;
encrypting one or more parts of the message using the interchange key,
wherein
the encrypting the one or more parts of the message produces an encrypted one or more parts of the message;
encrypting the interchange key with the public key for the identifier, wherein
the encrypting the interchange key produces an encrypted interchange key; and
storing the encrypted one or more parts of the message and the encrypted interchange key, wherein
the encrypted one or more parts of the message and the encrypted interchange key are stored at the messaging server.

7. The method of claim 6, further comprising:
receiving a request to access at least one part of the message and the interchange key;
retrieving the at least one part of the message and the interchange key,
wherein
the at least one part of the message and the interchange key are retrieved in an encrypted form; and
transmitting the at least one part of the message and the interchange key, in the encrypted form, to the messaging client.

8. The method of claim 6, further comprising:
analyzing one or more words in the message;
creating an index key by performing a hash function on the public key for the identifier;
performing a keyed hash function for each of the one or more words in the message; and
generating an index, wherein
the index is generated using the index key and the keyed hashes for each word in the message.

9. The method of claim 8, further comprising:
retrieving the index; and
performing a search for a word in the message, wherein the search is performed using the index.

10. A computer program product comprising:
a plurality of instructions, comprising
a first set of instructions, executable on a computer system, configured to generate a master private key,
a second set of instructions, executable on the computer system, configured to generate a master public key, wherein the master public key corresponds to the master private key, and the master public key and the master private key are generated at a messaging client,
a third set of instructions, executable on the computer system, configured to transmit the master public key, wherein the transmitting is performed without transmitting the master private key, and the master public key is transmitted to a messaging server;
a fourth set of instructions, executable on the computer system, configured to transmit a message comprising a plurality of message parts that includes at least message text and message metadata;
a fifth set of instructions, executable on the computer system, configured to utilize offset information to divide the message into the plurality of message parts that are stored in the messaging server; and
a sixth set of instructions, executable on the computer system, configured to request at least one of the message parts of the message stored in the messaging server using the offset information and an interchange key corresponding to the message, wherein the interchange key is decrypted by the messaging client using the master private key and used by the messaging client to decrypt the at least one of the requested message parts that has been encrypted by the messaging server;

wherein the sixth set of instructions, executable on the computer system, further configured to:

generate a message retrieval request for at least one of the message parts of the message stored in the messaging server;

generate a sized prefix and suffix area to the at least one of the message parts wherein the size of the prefix and suffix area is computed by hashing the interchange key;

add the sized prefix and suffix area to the offset information of the message retrieval request to obfuscate size and position information of the at least one of the message parts stored in the messaging server; and a non-transitory computer-readable storage medium, wherein the instructions are encoded in the non-transitory computer-readable storage medium.

11. The computer program product of claim 10, wherein the message is to be grouped as part of a first group of messages, and the first group of messages is identified by an identifier.

12. The computer program product of claim 11, wherein the instructions further comprise:

a seventh set of instructions, executable on the computer system, configured to retrieve the master private key;

a eighth set of instructions, executable on the computer system, configured to generate a private key for the identifier;

a ninth set of instructions, executable on the computer system, configured to receive the at least one part of the message and the interchange key, wherein the at least one part of the message and the interchange key are received in an encrypted form, and the at least one part of the message and the interchange key are received in the encrypted form from the messaging server;

a tenth set of instructions, executable on the computer system, configured to decrypt the interchange key using the private key for the identifier, wherein the tenth set of instructions produces a decrypted interchange key; and a eleventh set of instructions, executable on the computer system, configured to decrypt the at least one part of the message using the decrypted interchange key.

13. The computer program product of claim 11, wherein the instructions further comprise:

a seventh set of instructions, executable on the computer system, configured to transmit a private key corresponding to the identifier to a second messaging client, wherein the transmitting allows the second messaging client to access the message from the messaging server.

14. The computer program product of claim 10, wherein the instructions further comprise:

a seventh set of instructions, executable on the computer system, configured to receive a master public key identifier at the messaging server;

a eighth set of instructions, executable on the computer system, configured to identify an identifier for a first group of messages; and a ninth set of instructions, executable on the computer system, configured to generate a public key for the identifier, wherein the public key for the identifier is generated by combining the master public key with the identifier, and the public key for the identifier is generated at the messaging server.

15. The computer program product of claim 14, wherein the instructions further comprise:

a tenth set of instructions, executable on the computer system, configured to receive a message, wherein the message is to be grouped as part of the first group of messages;

a eleventh set of instructions, executable on the computer system, configured to generate an interchange key for the one or more parts of the message;

a twelfth set of instructions, executable on the computer system, configured to encrypt one or more parts of the message using the interchange key, wherein the twelfth set of instructions produces an encrypted one or more parts of the message;

a thirteenth set of instructions, executable on the computer system, configured to encrypt the interchange key with the public key for the identifier, wherein the thirteenth set of instructions produces an encrypted interchange key; and a fourteenth set of instructions, executable on the computer system, configured to store the encrypted one or more parts of the message and the encrypted interchange key, wherein the encrypted one or more parts of the message and the encrypted interchange key are stored at the messaging server.

16. The computer program product of claim 15, wherein the instructions further comprise:

a fifteenth set of instructions, executable on the computer system, configured to receive a request to access at least one part of the message and the interchange key;

a sixteenth set of instructions, executable on the computer system, configured to retrieve the at least one part of the message and the interchange key, wherein the at least one part of the message and the interchange key are retrieved in an encrypted form; and a seventeenth set of instructions, executable on the computer system, configured to transmit the at least one part of the message and the interchange key, in the encrypted form, to the messaging client.

17. The computer program product of claim 15, wherein the instructions further comprise:

a fifteenth set of instructions, executable on the computer system, configured to analyze one or more words in the message;

a sixteenth set of instructions, executable on the computer system, configured to create an index key by performing a hash function on the public key for the identifier;

a seventeenth set of instructions, executable on the computer system, configured to perform a keyed hash function for each of the one or more words in the message; and a sixteenth set of instructions, executable on the computer system, configured to generate an index, wherein the index is generated using the index key and the keyed hashes for each word in the message.

18. The computer program product of claim 17, wherein the instructions further comprise:

a seventeenth set of instructions, executable on the computer system, configured to retrieve the index; and a eighteenth set of instructions, executable on the computer system, configured to perform a search for a word in the message, wherein the search is performed using the index.

19. A computer system comprising:
a processor;
a non-transitory computer-readable storage medium coupled to the processor; and
a plurality of instructions, encoded in the non-transitory computer-readable storage medium, configured to cause the processor to
   generate a master private key,
   generate a master public key, wherein
   the master public key corresponds to the master private key, and the master public key and the master private key are generated at a messaging client,
   transmit the master public key, wherein
      the instructions configured to cause the processor to transmit are executed without transmitting the master private key, and the master public key is transmitted to a messaging server
   transmit, to the messaging server by the messaging client, a message comprising a plurality of message parts that includes at least message text and message metadata;
   utilize, by the messaging server, offset information to divide the message into the plurality of message parts that are stored in the messaging server; and
   request, by the messaging client from the messaging server, at least one of the message parts of the message stored in the messaging server using the offset information and an interchange key corresponding to the message, wherein the interchange key is decrypted by the messaging client using the master private key and used by the messaging client to decrypt the at least one of the requested message parts that has been encrypted by the messaging server;
   wherein the request, by the messaging client from the messaging server, further comprises:
      generate, by the messaging client, a message retrieval request for at least one of the message parts of the message stored in the messaging server;
      generate, by the messaging client, a sized prefix and suffix area to the at least one of the message parts wherein the size of the prefix and suffix area is computed by hashing the interchange key; and
      add, by the messaging client, the sized prefix and suffix area to the offset information of the message retrieval request to obfuscate size and position information of the at least one of the message parts stored in the messaging server.

20. The computer system of claim 19,
wherein the message is to be grouped as part of a first group of messages, and the first group of messages is identified by an identifier.

\* \* \* \* \*

UNITED STATES PATENT AND TRADEMARK OFFICE
CERTIFICATE OF CORRECTION

PATENT NO. : 10,020,940 B2
APPLICATION NO. : 14/628595
DATED : July 10, 2018
INVENTOR(S) : Freed Page 1 of 1

It is certified that error appears in the above-identified patent and that said Letters Patent is hereby corrected as shown below:

In the Specification

In Column 2, Line 28, after "programs" insert -- . --.

Signed and Sealed this
Ninth Day of April, 2019

Andrei Iancu
*Director of the United States Patent and Trademark Office*